US007146444B2

(12) United States Patent
Sadowsky et al.

(10) Patent No.: US 7,146,444 B2
(45) **Date of Patent: *Dec. 5, 2006**

(54) METHOD AND APPARATUS FOR PRIORITIZING A HIGH PRIORITY CLIENT

(75) Inventors: Jonathan B. Sadowsky, Sacramento, CA (US); Aditya Navale, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/009,265

(22) Filed: Dec. 9, 2004

(65) Prior Publication Data

US 2005/0116959 A1 Jun. 2, 2005

Related U.S. Application Data

(63) Continuation of application No. 10/077,838, filed on Feb. 15, 2002, now Pat. No. 6,842,807.

(51) Int. Cl.
*G06F 13/362* (2006.01)
*G06F 13/14* (2006.01)

(52) U.S. Cl. ........................ 710/116; 710/241; 710/41; 370/232

(58) Field of Classification Search .................. 710/56, 710/107, 240, 243, 151, 158, 116, 241; 345/519, 345/535; 370/230, 231, 232, 337, 252, 412, 370/468; 324/225; 709/224, 234, 235; 375/233; 707/10
See application file for complete search history.

(56) References Cited

U.S. PATENT DOCUMENTS 5,363,500 A * 11/1994 Takeda ....................... 345/535
5,404,505 A * 4/1995 Levinson ..................... 707/10
5,434,848 A * 7/1995 Chimento et al. .......... 370/232
5,619,134 A * 4/1997 Watanabe et al. ........... 324/225
5,673,416 A * 9/1997 Chee et al. ................. 345/535
5,784,569 A * 7/1998 Miller et al. ................ 709/235
6,011,778 A * 1/2000 Kilkki et al. ............... 370/232
6,011,804 A * 1/2000 Bertin et al. ................ 370/468
6,016,528 A * 1/2000 Jaramillo et al. ........... 710/243
6,119,207 A * 9/2000 Chee .......................... 711/158
6,125,396 A * 9/2000 Lowe ......................... 709/234
6,157,978 A * 12/2000 Ng et al. .................... 710/240
6,188,670 B1 * 2/2001 Lackman et al. ........... 370/231
6,199,149 B1 3/2001 Meinerth et al.
6,205,524 B1 * 3/2001 Ng ............................ 711/151
6,219,704 B1 * 4/2001 Kim et al. .................. 709/224
6,232,990 B1 * 5/2001 Poirion ....................... 345/519
6,233,226 B1 * 5/2001 Gringeri et al. ............ 370/252
6,292,466 B1 * 9/2001 Droz .......................... 370/232
6,438,630 B1 * 8/2002 DeMoney .................... 710/56
6,469,982 B1 * 10/2002 Henrion et al. ............. 370/230
6,657,983 B1 * 12/2003 Surazski et al. ............ 370/337
6,701,397 B1 * 3/2004 Foster et al. ................ 710/107

(Continued)

Primary Examiner—Christopher E. Lee
(74) *Attorney, Agent, or Firm*—Philip A. Pedigo

(57) ABSTRACT

A method and apparatus of deprioritizing a high priority client. An isochronous data stream request is generally referred to as a "high priority" client. These high priority requests are sensitive to time, such that a certain amount of data must be retrieved within a certain amount of time. The fetching of this data will cause increased latencies on lower priority clients making requests for data. A method and apparatus for deprioritizing a high priority client is needed to improve the efficiency in handling data traffic requests from both high priority and lower priority clients.

10 Claims, 7 Drawing Sheets

With Deprioritization

U.S. PATENT DOCUMENTS 6,792,516 B1 * 9/2004 Mastronarde et al. ....... 711/158
6,842,807 B1 * 1/2005 Sadowsky et al. .......... 710/116
2001/0026555 A1 * 10/2001 Cnodder et al. ............ 370/412
2003/0031244 A1 * 2/2003 Vaidyanathan .............. 375/233
2003/0039211 A1 * 2/2003 Hvostov et al. ............ 370/230
2003/0152096 A1 8/2003 Chapman

* cited by examiner

Continuous integral of avg. bandwidth from time = 0 to ST

METHOD AND APPARATUS FOR PRIORITIZING A HIGH PRIORITY CLIENT

This is a continuation of application Ser. No. 10/077,838, filed Feb. 15, 2002, now U.S. Pat. No. 6,842,807.

BACKGROUND OF THE INVENTION

The present invention pertains to a method and apparatus for deprioritizing a high priority client. More particularly, the present invention pertains to a method of improving the efficiency in handling isochronous data traffic through the implementation of a deprioritizing device.

As is known in the art, isochronous data streams are time-dependent. It refers to processes where data must be delivered within certain time constraints. For example, multimedia streams require an isochronous transport mechanism to ensure that the data is delivered as fast as it is displayed and to ensure that the video is synchronized with the display timing. An isochronous data stream request is generally referred to as a "high priority" client. These high priority requests are sensitive to time, such that a certain amount of data must be retrieved within a certain amount of time.

Within an integrated chipset graphics system, large amounts of high priority data are constantly retrieved for display on a computer monitor (e.g. an overlay streamer requesting isochronous data). The lower priority client may, for example, be the central processing unit (CPU). This high priority client has certain known characteristics. The client fetches certain types of pixel data, which will eventually be displayed on the computer monitor. A large grouping of scanlines creates a 2-dimensional image that results in a viewable picture on a computer monitor. The behavior of the monitor is such, that one horizontal scanline is completely displayed before the monitor starts to display the next scanline. In addition, there exist screen timings that determine how long it takes to display the given scanline. The scanline itself also contains a fixed amount of data. Therefore, in order that there not be any corruption on the screen (i.e. the computer monitor displays garbage data), the pixels of the scanline must be fetched and be available to be displayed before the time that the screen is ready to draw the pixels. If a pixel is not yet ready, because the screen timings are fixed, the monitor will display something other than the expected pixel and move on with drawing the rest of the scanline incorrectly.

For this reason, all of the data for the current scanline is already available, fetched prior to being displayed, so that there will be no screen corruption. Typically, a First-In First-Out (FIFO) device is implemented to load the data of the request from memory (either from the cache, main or other memory). The data is then removed from the FIFO as needed by the requesting client. When the amount of data within the FIFO goes below a certain designated watermark, a high priority request is sent out to fill the FIFO again. However, there are instances when an isochronous streamer is fetching data that will not be needed for a considerable amount of time. The fetching of this data will cause increased latencies on lower priority clients making requests for data. For example, the higher priority of the isochronous streamer request will likely obstruct the lower priority requests of, for example, the CPU. All overlay requests are high priority, and as such, use up all available memory bandwidth. The CPU must then wait for the streamer's isochronous request to be fulfilled before it is serviced, although the data is not immediately needed for display. This aggressive fetching induces long latencies on the CPU, thereby decreasing overall system performance.

In view of the above, there is a need for a method and apparatus for deprioritizing a high priority client to improve the efficiency in handling data traffic requests from both high priority and lower priority clients.

DETAILED DESCRIPTION OF THE DRAWINGS

Figure 1:
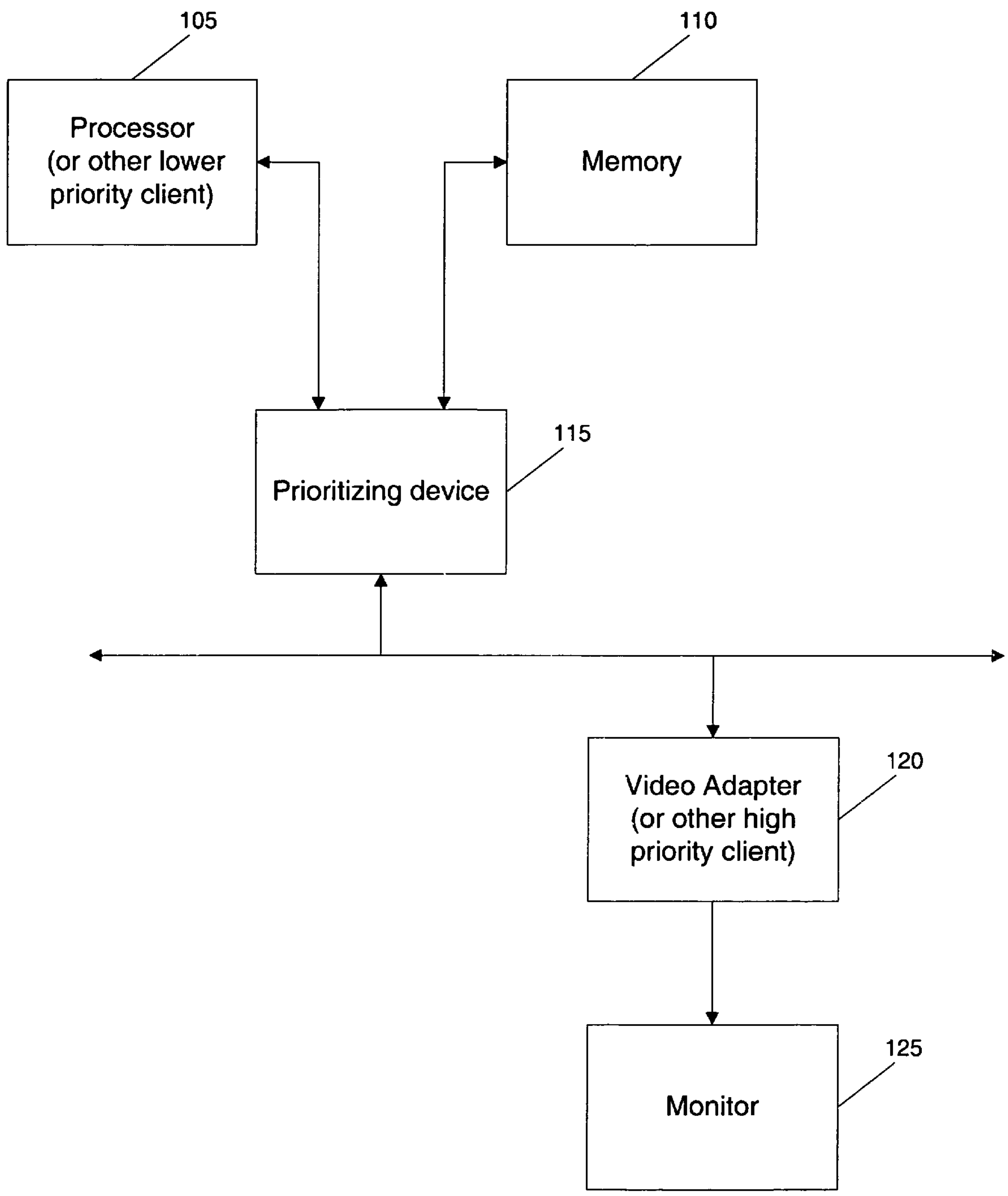
FIG. 1 is a block diagram of a portion of computer system employing an embodiment of the present invention.

Referring to FIG. 1, a block diagram of a portion of computer system employing an embodiment of the present invention is shown. In this embodiment, a high priority client 120 (video adapter shown) sends isochronous data stream requests for memory 110 needed for display by monitor 125. Likewise, a lower priority client 105 (a processor is shown) sends data requests for memory 110. Prioritizing device 115 receives requests from both video adapter 120 and processor 105. Prioritizing device 115 utilizes the method embodied in the present invention to deprioritize isochronous requests from video adapter 120 as needed. High priority requests from video adapter 120 can be deprioritized if monitor 125 has enough data to display its scanlines properly. When deprioritized, the requests from a lower priority client 105 can be serviced. As a result, servicing of requests from both clients can be completed with greater efficiency, thereby improving overall system performance.

Figure 2A:
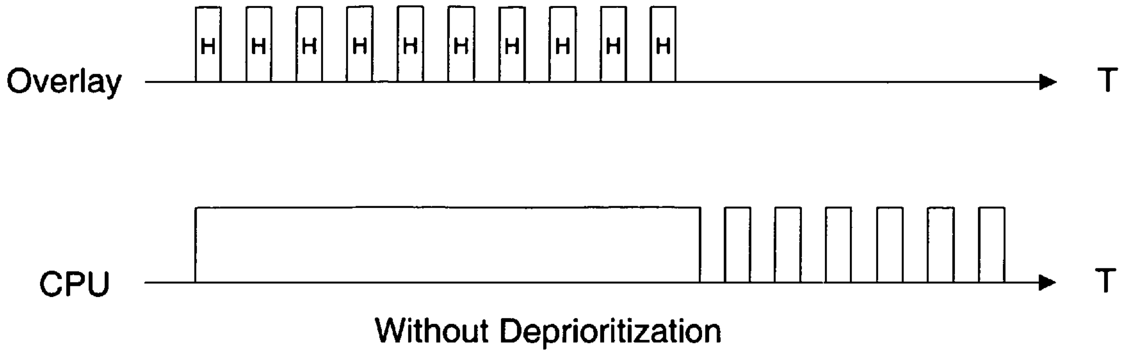
FIG. 2A is a diagram of example cycles without deprioritization.

Referring to FIG. 2A, a diagram of example cycles within a computer system without deprioritization is shown. In the given example, the duration of time shown is the time elapsed for displaying one horizontal scanline, with each block indicating a single request from memory being fulfilled. The overlay data requests shown each have an "H," indicating that all the overlay cycles are high priority.

Without utilizing deprioritization, all overlay cycles remain a high priority, and as such, use all the available bandwidth. As a result, any CPU requests that come along suffer long latencies, thereby reducing overall system performance.

Figure 2B:
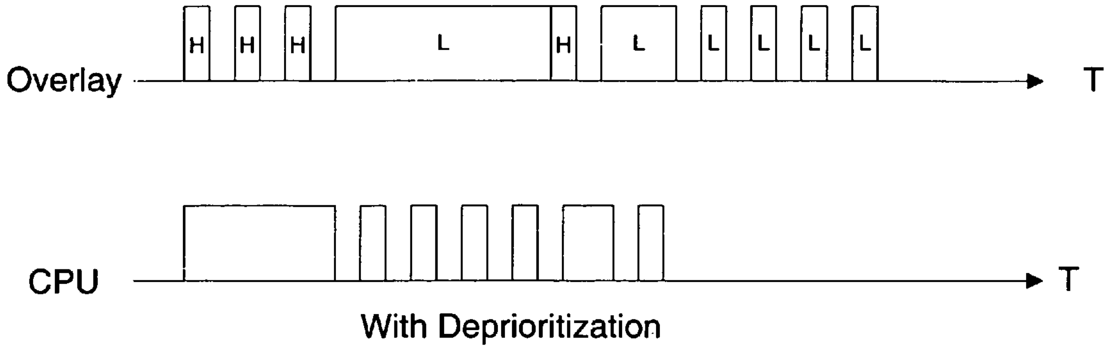
FIG. 2B is a diagram of example cycles with deprioritization employing an embodiment of the present invention.

Referring to FIG. 2B, a diagram of example cycles within a computer system with deprioritization employing an embodiment of the present invention is shown. In the given example, the duration of time shown is the time elapsed for displaying one horizontal scanline, with each block indicating a single request from memory being fulfilled. The overlay data requests shown are marked with an "H," indicating that request is a high priority, or marked with an "L," indicating that the request has been deprioritized, with a lower priority than the CPU. In this example, the first few overlay requests are high priority such that the overlay streamer has retrieved enough data for the given amount of time. In an embodiment of the present invention, when the overlay streamer has fetched "far enough" ahead of where the monitor is displaying data, the higher priority client will be deprioritized such that the lower priority clients can have requests serviced during these times. After that point, the overlay requests are all low priority. Whenever a CPU request collides with a lower priority overlay request, the CPU requests are given priority and serviced first. In this example one overlay request is changed from a lower priority to high priority in order for the overlay streamer to "catch up" again with the data needed for the isochronous stream. However, no other client needs data, the overlay streamer will continue to fetch data and get even further ahead. As seen from the diagram of the given example, the latencies for the CPU requests are much improved, thereby giving the CPU a significant performance improvement. Furthermore, the data for the next scanline is still fetched within the time requirements, with all requests being fulfilled within a shorter time.

FIGS. 3 through 7 describe an algorithm that determines how and when the overlay cycles are deprioritized. To ensure a safe margin for the overlay data stream, the overlay stream is set to retrieve data from enough requests to stay exactly one scanline worth of data ahead of where the pixels are currently being displayed. For the graphs shown in FIG. 3 through FIG. 7, a number of variables and constraints are defined: SD=the amount of data to fetch for one scanline; ST=the amount of time it takes to display one scanline; D=the amount of data currently fetched (ranging from 0 to SD); T=the amount of time elapsed (ranging from 0 to ST); and AB=average bandwidth required to fetch SD of data in time ST (AB=SD/ST).

Figure 3:
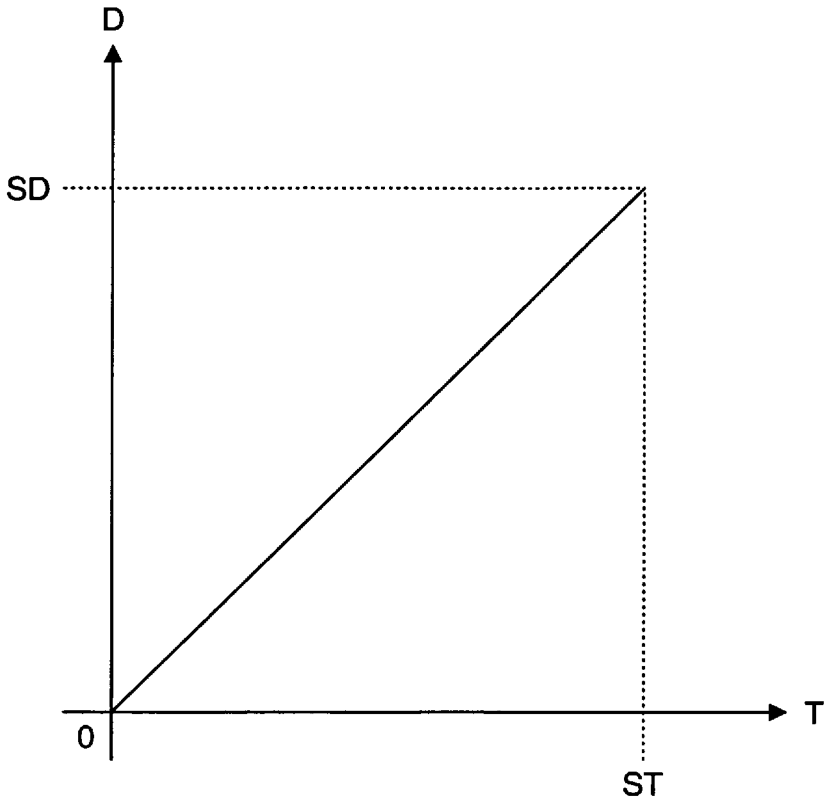
FIG. 3 is a graph of the average quantity of data fetched over time as an example of the method embodied in the present invention.

Referring to FIG. 3, a graph of the average quantity of data fetched over time as an example of the method embodied in the present invention is shown. If the overlay stream begins fetching the next line of data when the previous line is starting to be displayed, then the overlay streamer, in order to stay exactly one scanline worth of data ahead, must fetch data at the rate of the required average bandwidth (AB). The graph in FIG. 3 shows the amount of data fetched over time, the continuous integral of AB over time.

Figure 4A:
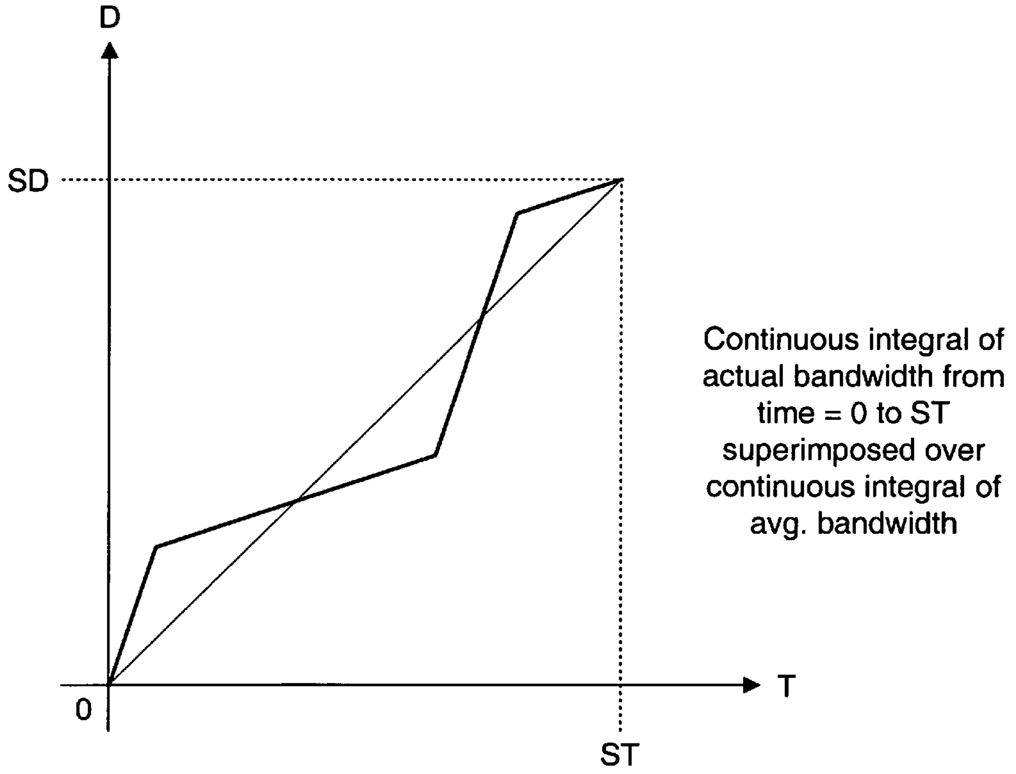
FIG. 4A is a graph of the actual quantity of data over time superimposed over the average quantity as an example of the method embodied in the present invention.
Figure 4B:
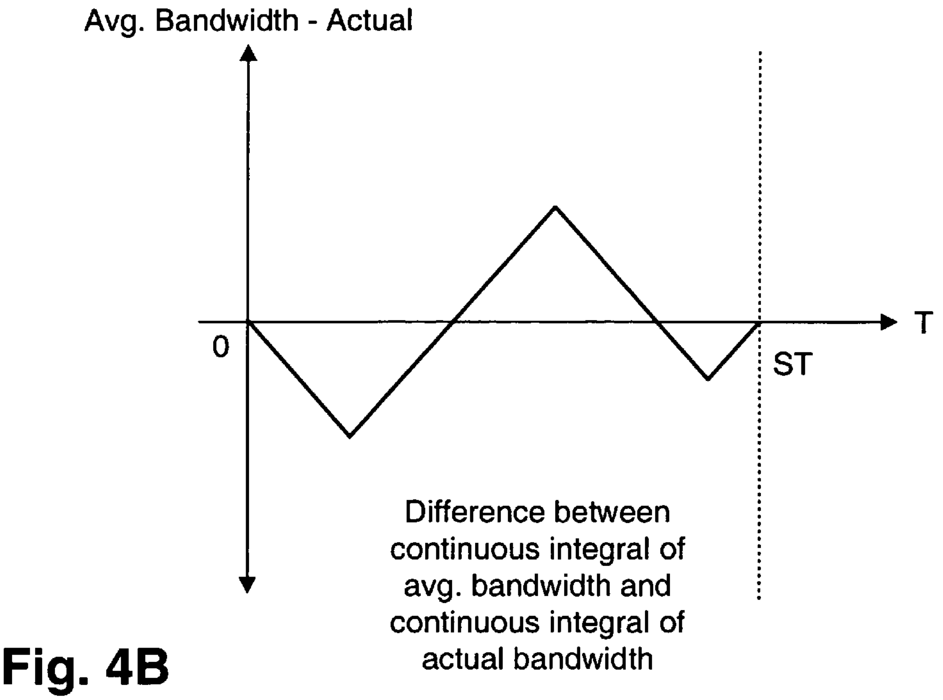
FIG. 4B is a graph of the difference between the continuous integral of average bandwidth and the continuous integral of actual bandwidth as an example of the method embodied in the present invention.

Referring to FIG. 4A, a graph of the actual quantity of data over time superimposed over the average quantity as an example of the method embodied in the present invention is shown. The graph shows the continuous integral of actual bandwidth mapped onto the continuous integral of AB over time, as shown in FIG. 3. To determine if the overlay streamer is ahead or behind the following calculation is performed: the continuous integral of the actual bandwidth is subtracted from the continuous integral of the expected average bandwidth. The difference between the two integrals is graphed in FIG. 4B. If the resulting number is negative, then the overlay streamer is ahead (i.e. there is more actual data requested than needed), which indicates that the requests should then be deprioritized to low priority requests. If the resulting number is positive, then the overlay streamer is behind (i.e. there is less data being requested then needed), which indicates that the overlay requests should be high priority requests. As determined from the graph shown in FIG. 4B, the priority switches when the polarity of the difference calculation changes.

Thus, the actual algorithm can be implemented by calculating the difference between the discrete integrals of expected average bandwidth and actual bandwidth, at any given time between 0 and ST. The polarity, positive or negative, of the calculated difference determines whether the current request will be a higher or lower priority than the CPU traffic.

Figure 5:
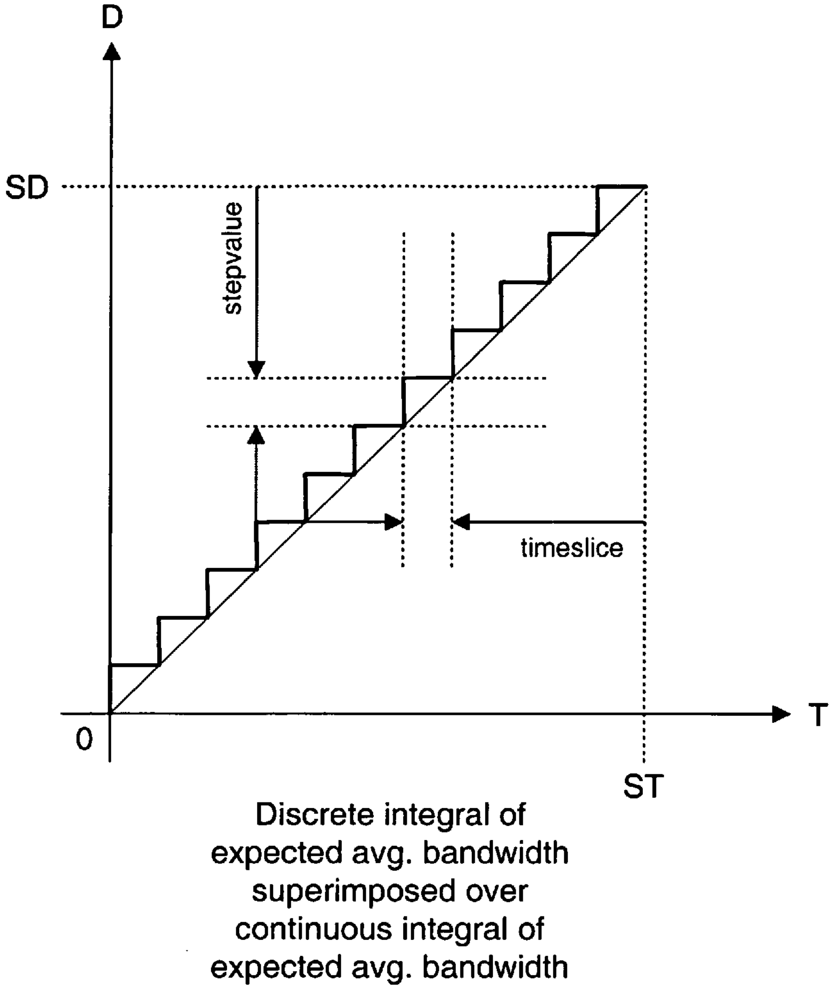
FIG. 5 is a graph comparing the discrete versus continuous integral of expected average bandwidth as an example of the method embodied in the present invention.

Referring to FIG. 5, a graph comparing the discrete versus continuous integral of expected average bandwidth as an example of the method embodied in the present invention is shown. Calculating the discrete integral of expected average bandwidth is the critical calculation for this implementation. To calculate this value, a number of values are needed, including, the time it takes for the monitor to display one scanline (including additional guardband), and the amount of data to be fetched for the one scanline displayed. Within certain hardware designs, such as an integrated graphics chipset, each step is fixed in value. For example, the stepvalue is commonly fixed in hardware to 32 bytes. Given that each step is a fixed value, and the number of core clocks to display one scanline is known, a timeslice value can be calculated as the total time to display a scanline divided by the total number of steps for one scanline:

Timeslice=*ST* (in core clock cycles)/(*SD*/stepvalue=total number of steps).

Utilizing the stepvalue and timeslice, the discrete integral of the expected average bandwidth can be found, as shown in FIG. 5. Additionally, to provide extra guardband, the integral of expected average bandwidth has an initialized constant value (at time=0) of one stepvalue. By setting the integral at time=0 to one stepvalue, the discrete integral will begin by requesting more data to be fetched than is actually necessary, preventing the overlay streamer from falling behind when initialized.

The timeslice value calculated is for a stepvalue fixed at 32 bytes assuming only one scanline is to be fetched for each displayed scanline. If, however, more scanlines are to be fetched, the stepvalue is increased by the hardware such that the programmed timeslice value remains unchanged. In addition, the amount of data for a scanline fetched may be the amount of data in a normal scanline, half that much data, or even a quarter of the total amount of data. This enables the overlay streamer to calculate for YUV (Luminance-Bandwidth-Chrominance) data types as wells as RGB (Red-Green-Blue) data.

Figure 6:
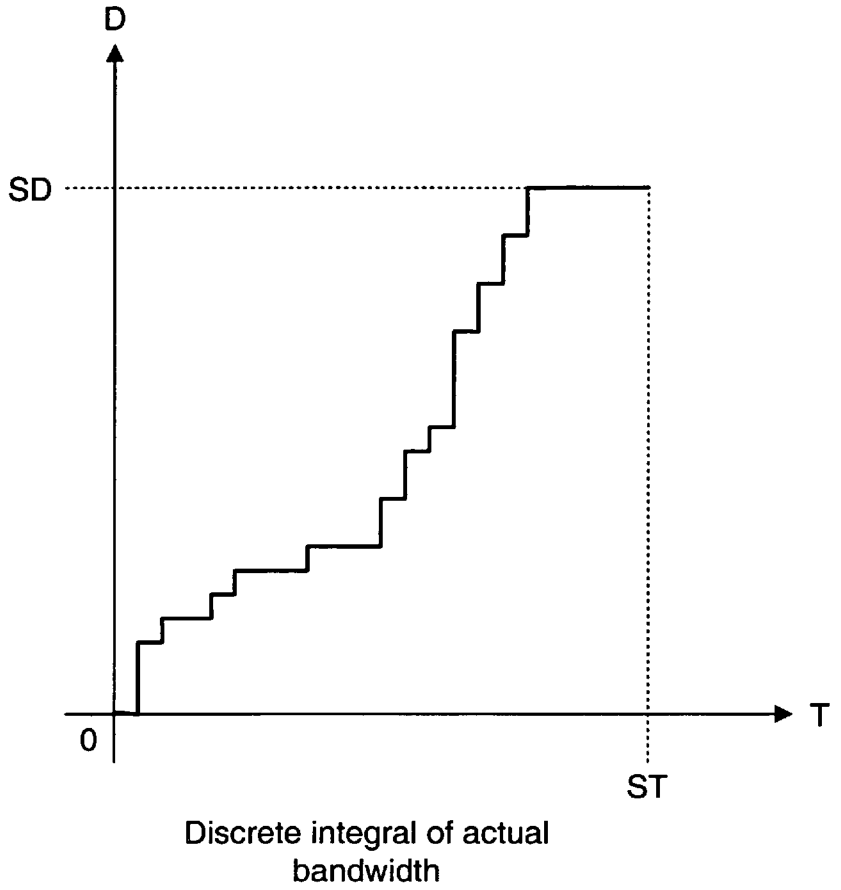
FIG. 6 is a graph of the discrete integral of actual bandwidth as an example of the method embodied in the present invention.

Referring to FIG. 6, a graph of the discrete integral of actual bandwidth as an example of the method embodied in the present invention is shown. This calculation is determined by following the requests of the overlay streamer. Each time the overlay streamer makes a request to memory for data, a counter is increased by the amount of data requested.

Figure 7A:
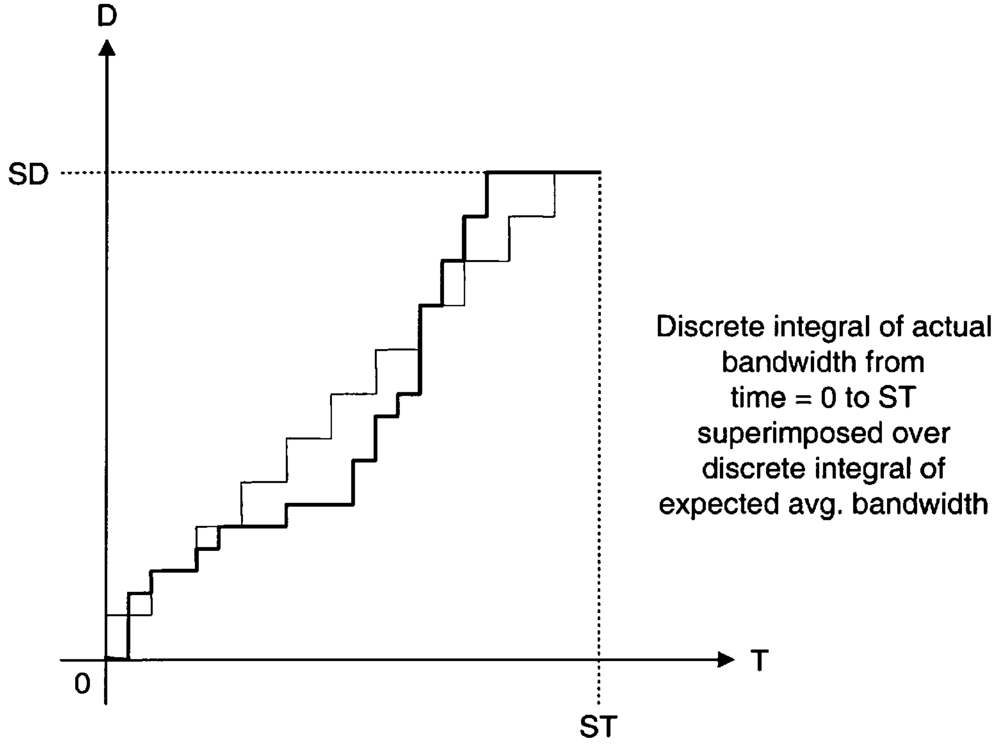
FIG. 7A is a graph of the discrete integral of actual bandwidth superimposed over the discrete integral of expected average bandwidth as an example of the method embodied in the present invention.
Figure 7B:
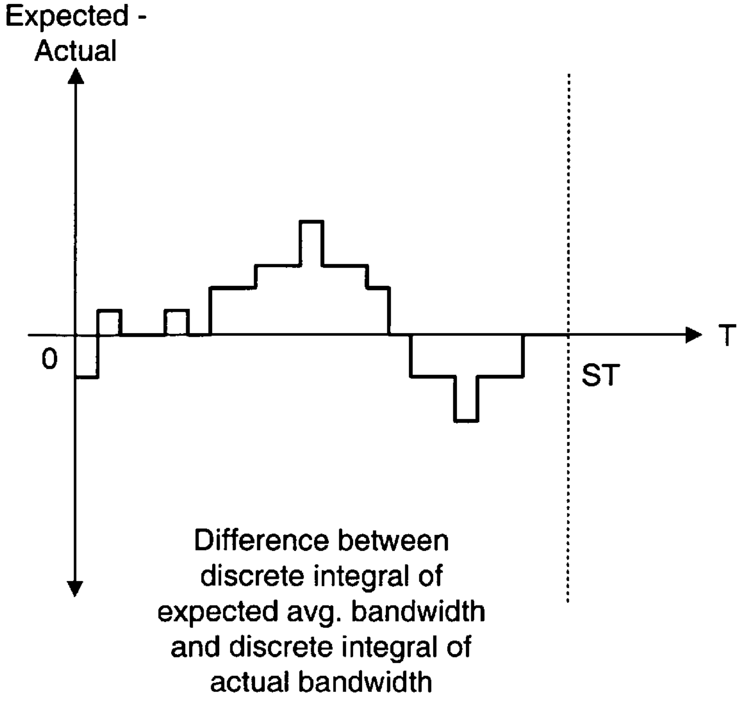
FIG. 7B is a graph of the difference between the discrete integral of expected average bandwidth and the discrete integral of actual bandwidth as an example of the method embodied in the present invention.

Referring to FIG. 7A, a graph of the discrete integral of actual bandwidth superimposed over the discrete integral of expected average bandwidth as an example of the method embodied in the present invention is shown. The actual priority determination is calculated by the difference of the two integrals. FIG. 7A superimposes the discrete integral of the expected average bandwidth of FIG. 5 (represented by a light line) and the discrete integral of the actual bandwidth of FIG. 6 (represented by darker line). FIG. 7B shows a graph of the difference between the two discrete integrals of FIG. 7A (expected average minus actual). Where the difference is negative, the overlay streamer is ahead of where it is expected to have fetched, and as such, the priority of requests are lower than the CPU traffic requests. When the difference is positive or zero (guardband issues may occur), the overlay streamer is considered to be behind where it should be and the requests are a higher priority than the CPU traffic requests. Here, in this embodiment of the invention, the actual priority calculation is done with one counter. Each instance a timeslice value elapses, the stepvalue is added to the counter. Every time a request is made, the request size is subtracted from the counter. The polarity of this counter indicates the current request priority of the overlay streamer.

Although a single embodiment is specifically illustrated and described herein, it will be appreciated that modifications and variations of the present invention are covered by the above teachings and within the purview of the appended claims without departing from the spirit and intended scope of the invention.

What is claimed is:

1. A method of prioritizing a data stream request, comprising:

determining a discrete integral of expected average bandwidth of said data stream request;

determining a discrete integral of actual bandwidth of said data stream request;

calculating a difference between said discrete integral of expected average bandwidth and said discrete integral of actual bandwidth; and prioritizing said data stream request based on a polarity of said calculation.

2. The method of claim 1 wherein prioritizing said data stream request is utilized to determine a priority of a data stream request from a first client with respect to a data stream request from a second client.

3. A method of prioritizing an isochronous overlay data stream request, comprising:

determining a discrete integral of expected average bandwidth of said overlay data stream request;

determining a discrete integral of actual bandwidth of said overlay data stream request;

calculating a difference between said discrete integral of expected average bandwidth and said discrete integral of actual bandwidth; and prioritizing said overlay data stream request based on a polarity of said calculation.

4. The method of claim 3 wherein determining said discrete integral of actual bandwidth comprises:

tracking an individual request of said overlay data stream request; and increasing a counter by an amount of data of said individual request.

5. The method of claim 4 wherein the difference between said discrete integrals is the discrete integral of expected average bandwidth minus the discrete integral of actual bandwidth.

6. The method of claim 5 wherein when said polarity is one of positive and zero, said overlay data stream requests have a higher priority than central processing unit requests.

7. The method of claim 6 wherein when said polarity is negative, said overlay data stream requests have a lower priority than central processing unit requests.

8. A set of instructions residing in a storage medium, said set of instructions capable of being executed by a processor to implement a method to deprioritize the priority level of an isochronous data stream request, the method comprising:

determining a discrete integral of expected average bandwidth of said data stream request;

determining a discrete integral of actual bandwidth of said data stream request;

calculating a difference between said discrete integral of expected average bandwidth and said discrete integral of actual bandwidth; and prioritizing said data stream request based on the polarity of said calculation.

9. The set of instructions of claim 8 wherein determining said discrete integral of actual bandwidth comprises:

tracking an individual request of said overlay data stream request; and increasing a counter by an amount of data of said individual request.

10. The set of instructions of claim 9 wherein the difference between said discrete integrals is the discrete integral of expected average bandwidth minus the discrete integral of actual bandwidth.

* * * * *